(12) United States Patent
Festner et al.

(10) Patent No.: US 11,994,101 B2
(45) Date of Patent: May 28, 2024

(54) WIND TURBINE ROTOR BLADE, MOUNTING SLEEVE AND METHOD FOR CONNECTING TWO ROTOR BLADE SEGMENTS

(71) Applicant: Nordex Energy SE & Co. KG, Hamburg (DE)

(72) Inventors: Gerald Festner, Klein Krams (DE); Torsten Wackrow, Rostock (DE); Nils Toenissen, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 110 days.

(21) Appl. No.: 17/712,745

(22) Filed: Apr. 4, 2022

(65) Prior Publication Data

US 2022/0228554 A1 Jul. 21, 2022

Related U.S. Application Data

(63) Continuation of application No. PCT/EP2019/076708, filed on Oct. 2, 2019.

(51) Int. Cl.
*F03D 1/06* (2006.01)

(52) U.S. Cl.
CPC ........ *F03D 1/0675* (2013.01); *F05B 2230/60* (2013.01); *F05B 2240/302* (2013.01); *F05B 2260/301* (2013.01)

(58) Field of Classification Search
CPC .... F03D 1/0675; F03D 1/0667; F03D 1/0677; F03D 1/066; F16B 7/06; F16B 7/10;
(Continued)

(56) References Cited

U.S. PATENT DOCUMENTS 9,797,369 B2 * 10/2017 Kratmann ............. F03D 1/0633
2005/0248156 A1 * 11/2005 Hsieh ...................... F16B 7/025
285/397

(Continued)

FOREIGN PATENT DOCUMENTS

CN 102606419 A 7/2012
DE 11 2010 003 218 T5 7/2012
(Continued)

OTHER PUBLICATIONS

Translation and Written Opinion of the International Searching Authority dated Jun. 29, 2020 for international application PCT/EP2019/076708 on which this application is based.
(Continued)

*Primary Examiner* — Topaz L. Elliott
*Assistant Examiner* — Ryan C Clark
(74) *Attorney, Agent, or Firm* — Walter Ottesen, P.A.

(57) ABSTRACT

A wind turbine rotor blade has a first rotor blade segment with a first connection end and a second rotor blade segment with a second connection end assigned to the first end. The first segment has first mounting sleeves at the first end. The first mounting sleeves each have a first internal thread. The second rotor blade segment has second mounting sleeves at the second connection end. Each of the second sleeves define a longitudinal axis and has a second internal thread arranged therein. Each of the second internal threads is displaceable axially with respect to the corresponding longitudinal axes. The rotor blade further has a plurality of connecting bolts threadably engaging a pair of first and second sleeves via corresponding internal threads such that the first segment and the second segment are mechanically interconnected at the first end and the second end.

16 Claims, 9 Drawing Sheets

(58) Field of Classification Search
CPC .. F16B 7/18; Y10T 29/4932; Y10T 29/49963; F05B 2230/60; F05B 2240/302; F05B 2260/301
See application file for complete search history.

(56) References Cited

U.S. PATENT DOCUMENTS

| | | |
|---|---|---|
| 2007/0290118 A1 | 12/2007 | Stiesdal |
| 2013/0108464 A1* | 5/2013 | McEwen ................ F03D 1/065 416/244 R |
| 2014/0127028 A1 | 5/2014 | Feigl et al. |
| 2014/0345110 A1* | 11/2014 | Schmidt ................ F16B 29/00 411/21 |
| 2015/0292477 A1 | 10/2015 | Kratmann et al. |
| 2015/0354531 A1 | 12/2015 | Kratmann |
| 2016/0169195 A1 | 6/2016 | Johnson et al. |
| 2017/0045032 A1 | 2/2017 | Jacobsen et al. |
| 2017/0089324 A1* | 3/2017 | Sanz Pascual ............ F03D 1/06 |
| 2017/0259464 A1* | 9/2017 | Scheungraber ........... F16B 7/06 |
| 2017/0268481 A1* | 9/2017 | Enevoldsen ............ F03D 13/10 |
| 2019/0032634 A1* | 1/2019 | Monreal Lesmes .. F03D 1/0675 |
| 2019/0264650 A1 | 8/2019 | Rubner et al. |
| 2019/0338750 A1 | 11/2019 | Bech |

FOREIGN PATENT DOCUMENTS

| | | | |
|---|---|---|---|
| DE | 10 2014 008 558 A1 | 12/2015 | |
| DE | 10 2016 110 551 A1 | 12/2017 | |
| EP | 1 815 137 A1 | 8/2007 | |
| EP | 2 930 350 A1 | 10/2015 | |
| EP | 3 032 092 A1 | 6/2016 | |
| EP | 3 150 848 A1 | 4/2017 | |
| EP | 3 219 979 A1 | 9/2017 | |
| EP | 3 657 012 A1 | 5/2020 | |
| JP | 2006-329109 A | 12/2006 | |
| WO | 2015/124568 A1 | 8/2015 | |
| WO | 2015/181401 A1 | 12/2015 | |
| WO | WO-2017101943 A1 * | 6/2017 | ........... F03D 1/0658 |
| WO | 2018/121826 A1 | 7/2018 | |
| WO | WO-2018121826 A1 * | 7/2018 | ............. B29C 70/48 |

OTHER PUBLICATIONS

International Search Report of the European Patent Office dated Jun. 29, 2020 for international application PCT/EP2019/076708 on which this application is based.

* cited by examiner

WIND TURBINE ROTOR BLADE, MOUNTING SLEEVE AND METHOD FOR CONNECTING TWO ROTOR BLADE SEGMENTS

CROSS REFERENCE TO RELATED APPLICATION

This application is a continuation application of international patent application PCT/EP2019/076708, filed Oct. 2, 2019, designating the United States, the entire content of which is incorporated herein by reference.

TECHNICAL FIELD

The disclosure relates to a wind turbine rotor blade which is formed by two rotor blade segments. The disclosure also relates to a mounting sleeve for a wind turbine rotor blade, and to a method for connecting two rotor blade segments.

BACKGROUND

A multiplicity of wind turbines having wind turbine rotor blades (also for short below: rotor blades) are known from the prior art and are used for converting wind power into electrical energy. Wind turbines have a multiplicity of components which are connected to one another, for example by means of a flange connection. For example, in the region of a rotor blade root, the rotor blades have a rotor blade connection with a multiplicity of mounting sleeves which are integrated in the laminate and via which the rotor blades are connected by means of fastening screws or fastening screw bolts to a bearing ring of what is referred to as a pitch bearing or to a component connected to the bearing ring, for example what is referred to as an extender of the wind turbine. The mounting sleeves can be part of a flange insert for the rotor blade connection. Such a construction is known, for example, from US 2017/0045032.

Alternatively, use is also made of (flange) connections for the connection of rotor blade segments that, arranged and assembled according to length, form a rotor blade. Such a rotor blade is referred to as a divided or segmented rotor blade. For example, mounting sleeves are then located in the laminate of a connection end or dividing flange of the rotor blade segments. The rotor blade segments can be connected to one another directly or via suitable intermediate pieces by means of screw bolts.

Divided rotor blades are preferred in particular for transport reasons and are gaining increasing importance especially because of the increasing overall length of rotor blades.

SUMMARY

It is an object of the disclosure to specify a concept for divided rotor blades that ensures a particularly advantageous connection of rotor blade segments.

According to an aspect, a wind turbine rotor blade which is formed by two rotor blade segments is disclosed. In other words, it involves a segmented or divided rotor blade. The first rotor blade segment has, at a first connection end (also connecting or coupling end), a plurality of first mounting sleeves which each have a first internal thread. The second rotor blade segment has, at a second connection end assigned to the first connection end, a plurality of second mounting sleeves. A second internal thread is arranged within each of the second mounting sleeves. Each second internal thread is displaceable axially with respect to a longitudinal axis of the corresponding second mounting sleeve. A connecting bolt is screwed into each pair of mutually aligned first and second mounting sleeves, into the two corresponding internal threads, such that the two rotor blade segments are mechanically connected to one another at the connection ends.

The described wind turbine rotor blade is formed by two releasable connected rotor blade segments. For this purpose, a number of connecting bolts (also screw bolts) which correspond to the respective first and second mounting sleeves and which screw together the two connection ends is provided. By means of the provision of a movable internal thread in the mounting sleeves of the one rotor blade segment, one side of the connection of the two rotor blade segments becomes what is referred to as a "movable bearing". One side of the bolt screw connection is therefore mounted in an axially displaceable manner. As a result, when the required screw-in length is correspondingly taken into consideration, each connecting bolt can be fitted to the corresponding other rotor blade segment without stress and without a tool. This arrangement or connection permits a simple, in particular installation-friendly, joining of the two blade segments. In particular, simple threading in of all of the bolts during the installation of the two rotor blade segments is made possible. In particular, the installation is conceived in such a manner that first of all the connecting bolts are screwed into one connection end, and then the corresponding mounting sleeves of the other rotor blade segment are pushed onto the connecting bolts. The axial displaceability of the second internal thread considerably simplifies the threading in for such large components as wind turbine rotor blades. All of the connecting bolts can therefore be fitted without constraining forces. A retrospective screwing together (tightening) or maintaining of the connections is also made possible in a particularly simple manner. Furthermore, an installation of the inner side or outer side of the blade is possible. In addition, a particularly easy connecting system is made possible, as a result of which the blade loads as a whole can be kept small.

In the case of the wind turbine rotor blade described, a particularly torque-resistant connection of the two blade segments is made possible. The absorption and transmission of particularly high tensile and compressive forces of the root-side segment from or to the tip-side segment is made possible. Furthermore, the described connecting arrangement permits transmission of forces from one blade segment into the second blade segment exclusively via the connecting bolt. Such a force flux is also referred to as "in-line". In other words, the blade segments are releasably joined without force deflections as in the case of eccentric screw connections or intermediate pieces subjected to a tensile or bending load.

Such a force flux permits a very good use of material and contributes to a low tendency to gapping of the connection and to a small bending loading of the screw connections, in particular in contrast to flange connections. Furthermore, a uniform distance between the mounting sleeves, and therefore between connection ends, is ensured over the entire connecting circumference.

The wind turbine rotor blade is divided into at least two rotor blade segments which are arranged in the longitudinal direction. Two or more dividing points are also conceivable, wherein the further segments can be mechanically coupled analogously to the described connecting system.

The first and second mounting sleeves are, for example, elements which are laminated into the connection ends of the blade segments. It is also conceivable for the two mounting sleeves to be formed by dividing an overall sleeve. In this case, the rotor blade is first of all manufactured as a whole, that is, with an integral casing or shell, and is subsequently separated, for example cut or sawn, at a dividing point. The separation takes place in the region of the overall sleeves, and therefore two sleeve halves arise per overall sleeve, one each for the two blade segments produced by division. These sleeve halves correspond to the first and second mounting sleeves mentioned. The mounting sleeves typically have a passage bore or passage opening, wherein the cross section, contours, wall thickness or the like partially changes or varies over the longitudinal axis of the sleeves. That is, the sleeves have different sections over the length.

According to an embodiment, each first internal thread is in a fixed position with respect to the corresponding first mounting sleeve. In other words, the first internal thread is not displaceable or movable and is therefore configured as a fixed bearing. For example, the first internal thread is formed integrally as part of the mounting sleeve. This contributes to the aforementioned advantages and functions, wherein in particular the screwing in of the bolts during the installation in combination with the movable bearing of the other blade segment is simplified.

According to an embodiment, each first internal thread is displaceable axially with respect to a longitudinal axis of the corresponding first mounting sleeve. As an alternative to the above embodiment, the first internal thread can likewise be displaceable axially and therefore permit more clearance and axial play during the installation of the two rotor blade segments.

According to an embodiment, an axial displaceability of each second internal thread is limited. Analogously, the displaceability of each first internal thread is limited, should the first internal threads likewise be configured to be movable. The limiting takes place, for example, by means of two opposite axial stops. This contributes to a simple and secure installation of the bolts in the internal threads and thus to a connection of the two rotor blade segments.

According to an embodiment, each second mounting sleeve has an axially displaceable thread insert having the second internal thread. A movable threaded insert is therefore involved. The movable threaded insert is placed in the sleeve, for example, before the sleeves are laminated in the corresponding rotor blade segment. The threaded insert permits the configuration as a movable bearing. The threaded insert is arranged in the interior of the sleeve, that is, in the passage bore or in a corresponding recess.

According to an embodiment, an outer shaping of each threaded insert is matched to an inner shaping of the corresponding second mounting sleeve in such a manner that each threaded insert is guided in the corresponding second mounting sleeve in a manner secure against rotation by means of a form fit. The threaded inserts and therefore the second internal threads therefore cannot be rotated with respect to the longitudinal axes of the second mounting sleeves. It is thus reliably made possible, for example, for the bolts to be able to be correspondingly screwed into the threaded insert.

According to an embodiment, the outer shaping of each threaded insert includes a polygon shape, in particular with rounded edges. Such a configuration contributes to the threaded insert being able to be produced simply and a low stress concentration being produced at the corresponding component, namely the mounting sleeve.

According to an embodiment, each connecting bolt has a tool engagement point, in particular a hexagon. The tool engagement point is a means or a device on the connecting bolt that permits engagement of a tool, for example a wrench or a pair of pliers, in order to rotate the screw connection.

According to an embodiment, a plurality of pressure pieces is arranged between the two connection ends of the two rotor blade segments, wherein each pressure piece is configured as a sleeve and applied to a corresponding connecting bolt. In other words, pressure pieces are mounted or pushed onto the connecting bolts between the two connections ends. In the connected state of the two rotor blade segments, the pressure pieces are clamped between the connection ends by means of the screw connection of the connecting bolts. The connection ends are therefore in touching contact with the pressure pieces. The pressure pieces are mounted on the bolts coaxially about the connecting bolts.

The pressure pieces arranged next to one another in the state mounted in accordance with the operation are, for example, individual pieces, that is, are mounted independently of one another. Two or more such pressure pieces arranged next to one another are alternatively connected to one another. For example, two or more such pressure pieces form a stiff unit, the pressure pieces being mounted as one part on the corresponding bolts. Alternatively, for example, all of the pressure pieces of one side, that is, suction side or pressure side, are connected. Also, all of the pressure pieces can be connected to one another such that only one unit has to be mounted.

The pressure pieces are configured in such a manner that only compressive forces act on them or are transmitted by them. The pressure pieces do not absorb any tensile forces or bending torques by force deflection. The prestressing force in the bolt is sufficiently large for the pressure piece to always be subjected to a pressure loading. For example, during bending of the rotor blades because of the wind loads which are in action, no movement of the pressure pieces relative to the connection ends takes place, for example sliding (that is, along a direction perpendicular to the longitudinal axes of the sleeves), since the pressure pieces are fixedly connected to the connection ends.

The pressure pieces can also be in form-fitting engagement with the connection ends of the segment.

This has the result that the tensile forces are transmitted substantially exclusively via the bolts. This is advantageous since very long tension rods can be selected as bolts, the tension rods being favorable for forces, torques and stresses. Transmission of the tensile forces is therefore not interrupted or is deflected via other elements, such as screwheads or intermediate pieces. Furthermore, a high thread distance between the first and second internal threads is made possible, which in turn has a favorable effect on the tensile forces being transmitted. The pressure pieces themselves therefore have to withstand or transmit lower loads, which has an advantageous effect on the service life of the pressure pieces.

According to an embodiment, each pressure piece has at least one opening, and therefore the tool engagement point is accessible via the opening. The opening may also be referred to as clearance or aperture and creates access for actuating a corresponding bolt.

According to an embodiment, walls of each pressure piece that delimit the opening are provided with one or more bevels. This facilitates the accessibility by the clearance being enlarged.

According to an embodiment, the first internal threads include either a right-handed thread or left-handed thread and the second internal threads the respective other. As a result, by rotation of the bolt, the latter can be screwed simultaneously into the internal threads of the mounting sleeves of both connection ends.

According to a further aspect, a mounting sleeve for a wind turbine rotor blade according to the first aspect is disclosed. An internal thread is arranged within the mounting sleeve, wherein the second internal thread is displaceable axially with respect to a longitudinal axis of the second mounting sleeve.

The mounting sleeve permits the aforementioned advantages and functions. What has been stated above applies analogously.

According to a further aspect, a pressure piece for a wind turbine rotor blade in the above-described aspect is disclosed. The pressure piece is configured as a sleeve through which a connecting bolt can be passed.

According to a further aspect, a method for connecting two rotor blade segments of a wind turbine rotor blade is disclosed. The first rotor blade segment has, at a first connection end, a plurality of first mounting sleeves which each have a first internal thread. The second rotor blade segment has, at a second connection end assigned to the first connection end, a plurality of second mounting sleeves which each have a second internal thread, wherein each second internal thread is displaceable axially with respect to a longitudinal axis of the corresponding second mounting sleeve. The method has the steps of:
- partially screwing each connecting bolt into a respective second internal thread of the second connection end in such a manner that each connecting bolt projects by a predetermined length from the second connection end,
- bringing the first connection end of the first rotor blade segment to the second connection end of the second rotor blade segment,
- partially screwing the respective connecting bolts into a respective first internal thread of the first connection end,
- pushing together the two rotor blade segments, and
- tightly screwing each connecting bolt in such a manner that a predetermined distance between a reference point defined on the connecting bolt and one of the two connection ends is achieved.

The method substantially permits the aforementioned advantages and functions.

To maintain the predetermined length during the step of partially screwing into the second internal thread, the length of the protruding bolt is compared with a desired value. When tightly screwing a bolt, the installation progress can be monitored continuously by, for example, looking at the reference point which migrates between the connection ends during the screw connection.

Owing to the axial displaceability of the second internal thread, each connecting bolt which is at least partially screwed in is displaced individually during the installation.

According to an embodiment, after the step of partially screwing the connecting bolts into the second internal thread, a respective pressure piece is applied to one connecting bolt each. In the tightly screwing step, the predetermined distance is achieved on the basis of a tool engagement point of the pressure pieces as reference point.

Further advantages, features and developments emerge from the exemplary embodiment below which is explained in conjunction with the figures. Identical, similar or identically acting elements are provided with the same reference signs in the figures. For clarity reasons, not all of the described elements in all of the figures may be identified by associated reference signs.

BRIEF DESCRIPTION OF THE DRAWINGS

The invention will now be described with reference to the drawings wherein.

DESCRIPTION OF THE PREFERRED EMBODIMENTS

Figure 1:
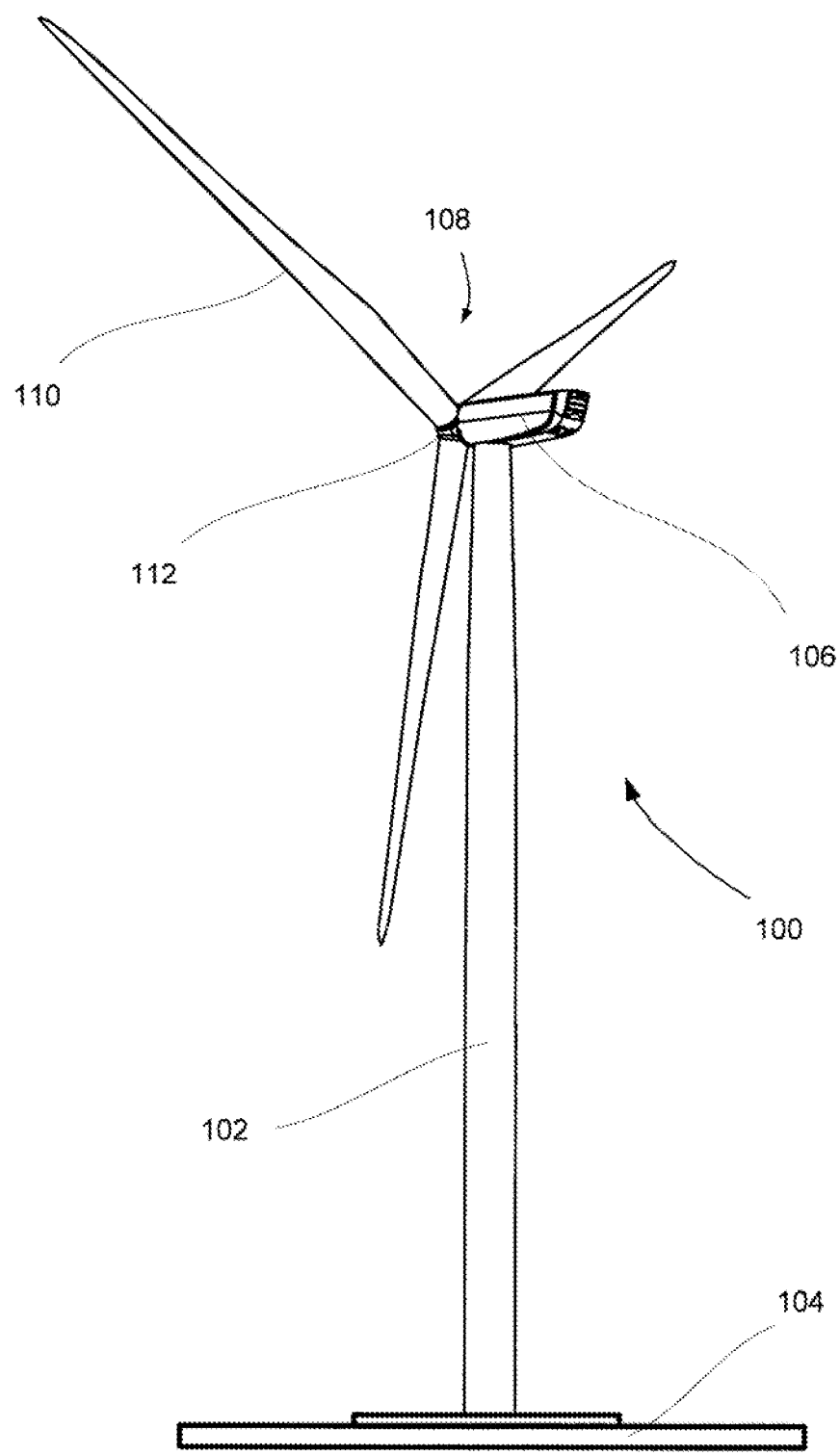
FIG. 1 shows a schematic illustration of a wind turbine.

FIG. 1 shows a schematic illustration of a wind turbine 100. The wind turbine 100 has a tower 102. The tower 102 is secured on an underlying surface by means of a foundation 104. A nacelle 106 is mounted rotatably at an end of the tower 102 opposite the underlying surface. The nacelle 106 has, for example, a generator which is coupled to a rotor 108 via a rotor shaft (not shown). The rotor 108 has one or more rotor blades 110 (wind turbines) which are arranged on a rotor hub 112.

During operation, the rotor 108 is set into rotation by an airflow, for example wind. This rotational movement is transmitted to the generator via the rotor shaft and optionally a transmission. The generator converts the kinetic energy of the rotor 108 into electrical energy.

Figure 2:
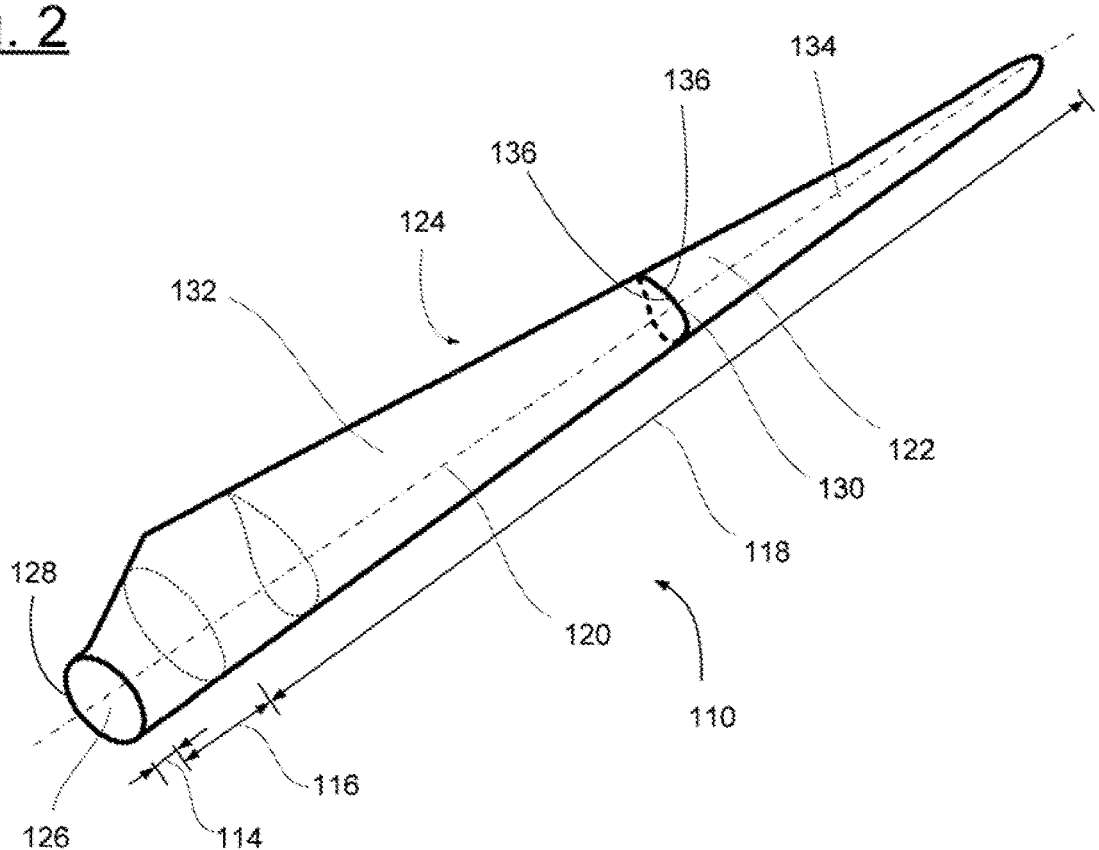
FIG. 2 shows a schematic illustration of a divided rotor blade with two rotor blade segments.

FIG. 2 shows a wind turbine rotor blade 110. The rotor blade 110 is in the form of a conventional rotor blade and has a rotor blade root region 114 which faces the rotor hub 112. The rotor blade root region 114 has typically a substantially circular cross section. The rotor blade root region 114 is adjoined by a transition region 116 and a profile region 118 of the rotor blade 110. The rotor blade 110 has, with respect to a direction of longitudinal extent 120, a pressure side 122 and an opposite suction side 124. The rotor blade 110 is configured to be substantially hollow in the interior.

In the rotor blade root region 114, a rotor blade connection end 126 is provided with a flange connection 128 by means of which the rotor blade 110 is mechanically connected to a pitch bearing or to an extender.

The rotor blade 110 has a dividing point 130 at which a blade-root-side rotor blade segment 132 and a blade-tip-side rotor blade segment 134 are connected to each other. For this purpose, the two segments 132, 134 have a respective rotor blade segment connection 136, 138 (also connection ends). The rotor blade 110 is therefore a divided rotor blade, as described at the beginning. Each connection end 136, 138 has a multiplicity of mounting sleeves which are arranged following the profile and have internal threads for receiving screw bolts, also called bearing bolts or connecting bolts. A connection end is realized, for example, as a flange insert which is inserted as an insert into a production mold for producing the rotor blade 110. However, it is also conceivable for no flange insert to be provided and for the mounting sleeves to be embedded and laminated directly into the rotor blade half shells. The mounting sleeves are, for example, steel sleeves. The connection of the two rotor blade segments 132, 134 is described in more detail below, wherein details are explained by way of example with reference to an individual bolt connection.

Figure 3:
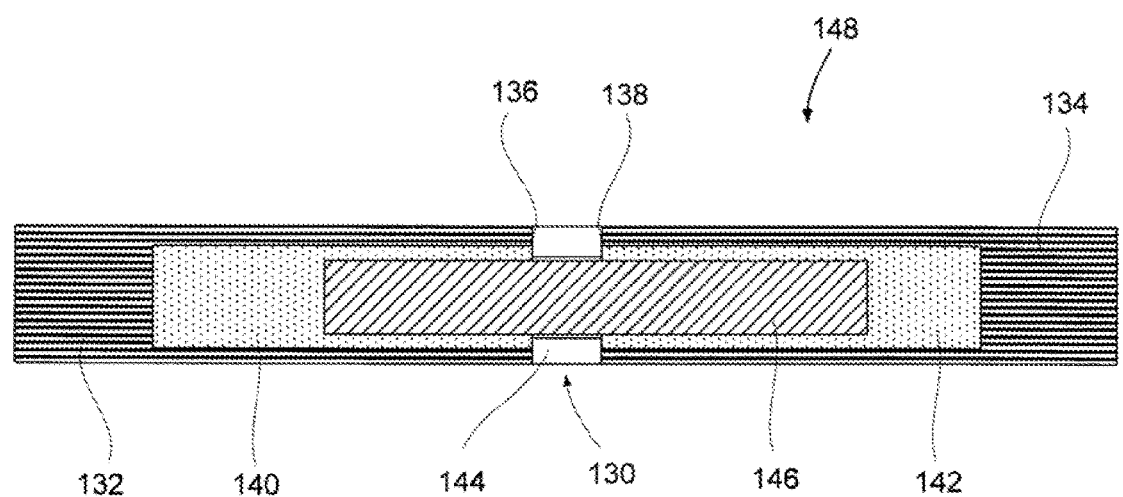
FIG. 3 shows a schematic basic sectional illustration of a bolt connection of two rotor blade segments of a rotor blade according to the prior art.

FIG. 3 shows a schematic sectional view through two connected rotor blade segments 132, 134 corresponding to the prior art, wherein an individual bolt connection is illustrated. The first connection end 136 of the first rotor blade segment 132 has a multiplicity of first mounting sleeves 140, as described at the beginning. The second connection end 138 of the second rotor blade segment 134 has a multiplicity of second mounting sleeves 142. A connecting bolt 146 is screwed into in each case one pair of mutually aligned first and second mounting sleeves 140, 142, the connecting bolt 146 mechanically fixedly connecting the two connection ends 136, 138 and therefore the two rotor blade segments 132, 134.

In addition, one pressure piece 144 per bolt connection 148 is clamped between the two connection ends 136, 138.

Figure 4:
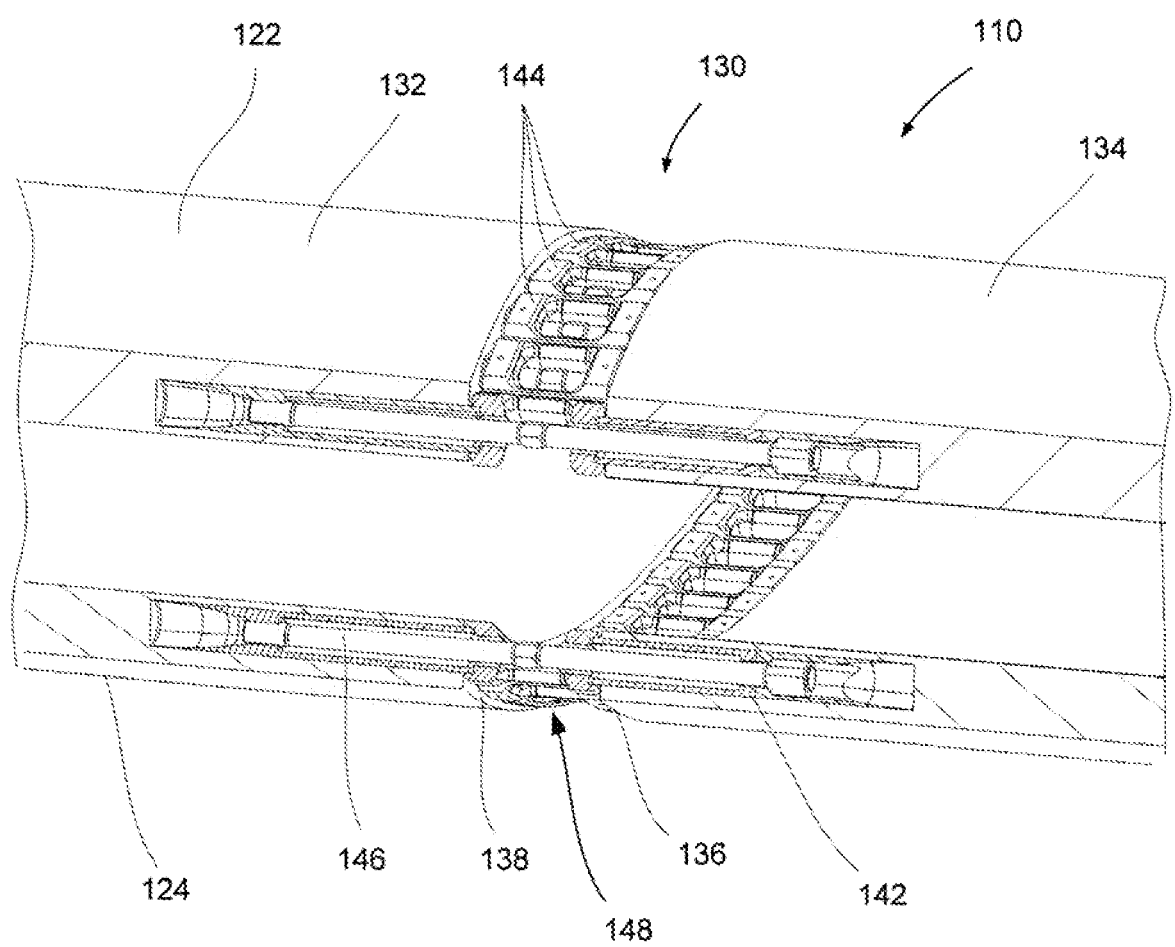
FIG. 4 shows a schematic cross-sectional view of the rotor blade with bolt connections according to an embodiment of the disclosure.

FIG. 4 shows a rotor blade 110 having a first rotor blade segment 132 and a second rotor blade segment 134 according to an embodiment of the disclosure in a perspective view in the region of the dividing point 130. On the suction side 124 and on the pressure side 122, a multiplicity of bolt connections 148 can be seen, in which pressure pieces 144 are in each case used. A bolt connection 148 is in each case illustrated in sectioned form, wherein it can be seen that a connecting bolt 146 is configured as a continuous bolt which connects the two connection ends 136, 138.

FIGS. 5 to 9 show an individual bolt connection 148 of the rotor blade 110 in detail.

Figure 5:
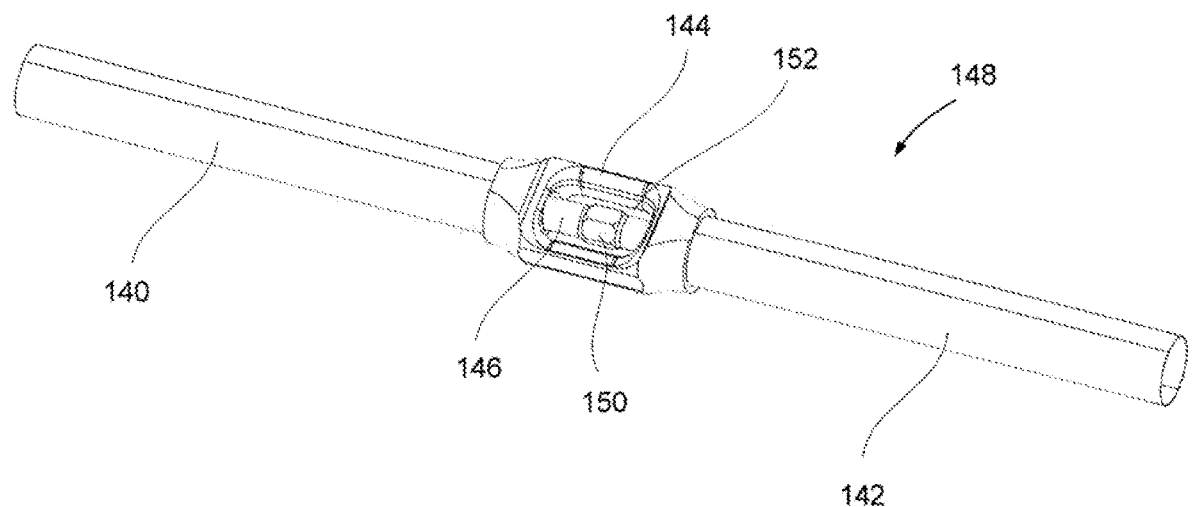
FIG. 5 shows a perspective view of an individual bolt connection between two rotor blade segments according to an embodiment of the disclosure.

FIG. 5 illustrates a first and a second mounting sleeve 140 and 142 into which a connecting bolt 146 is screwed, wherein a pressure piece 144 is arranged between the mounting sleeves 140 and 142. The pressure piece 144 is configured as a type of sleeve and is arranged on the connecting bolt 146. Each connecting bolt 146 has a tool engagement point 150 (here a hexagon in a suitable, typical wrench width) which is accessible via an opening 152 in the pressure piece 144.

Figure 6:
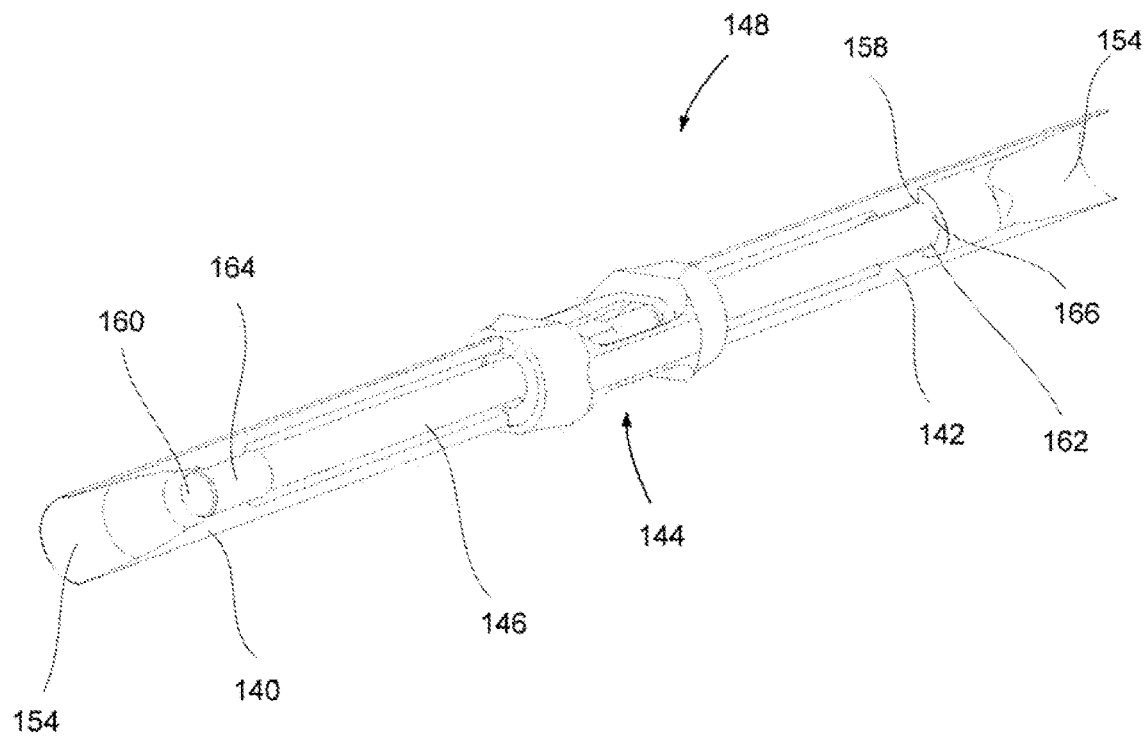
FIG. 6 shows a schematic cross-sectional view of the bolt connection according to FIG. 5.

FIG. 6 shows the bolt connection 148 in a perspective schematic sectional view. The mounting sleeves 140 and 142 each have a continuous opening 154 into which the connecting bolt 146 is at least partially inserted. For the screw connection to the connecting bolts 146, the first mounting sleeves 140 have a first internal thread 156 and the second mounting sleeves 142 have a second internal thread 158. The first internal threads 156 are configured as right-handed threads and the second internal threads 158 as left-handed threads. The connecting bolt 146 has corresponding external threads 164, 166 at its opposite ends 160, 162. The first internal threads 156 are fixed in position and, in the example, are formed integrally with the first mounting sleeves 140. The second internal threads 158 are axially displaceable, as will also be described. The mounting sleeve 142 having the second internal thread 158 is arranged in the first rotor blade segment 132. The latter can be arranged at the rotor-blade-tip end or rotor-blade-root end.

Figure 7:
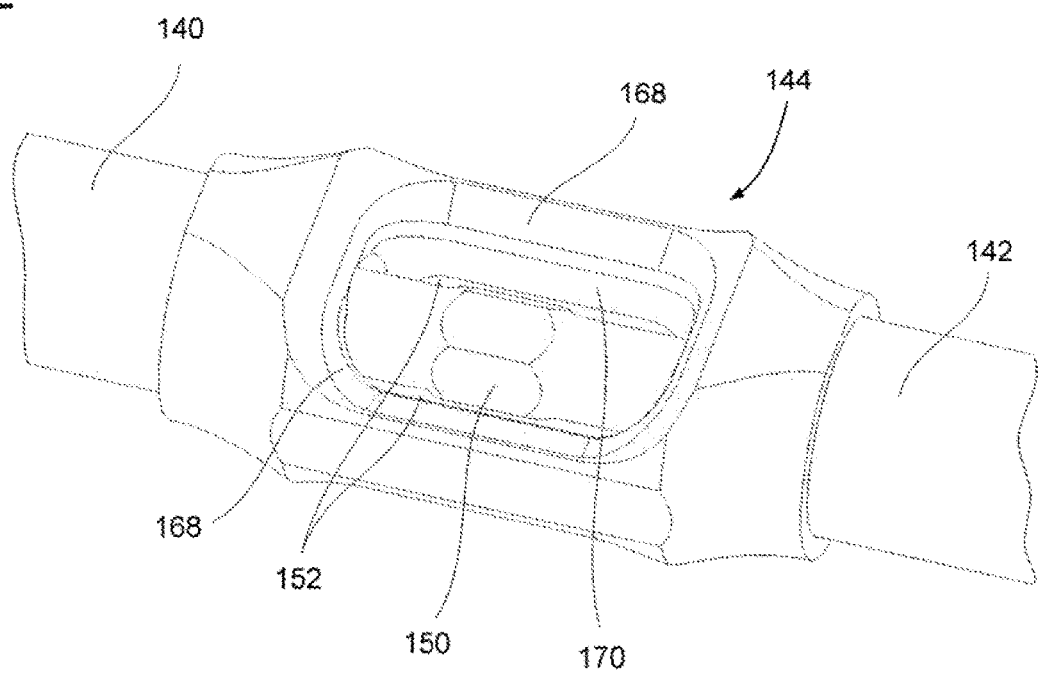
FIGS. 7 to 9 show detailed views of the bolt connection according to FIGS. 5 and 6.

FIG. 7 shows the pressure piece 144 in detail. The pressure piece has a plurality of bevels 168 on the walls 170 delimiting the opening 152. This optimizes the opening 152 in terms of space and therefore the access for a tool for fitting onto the tool engagement point 150.

Figure 8:
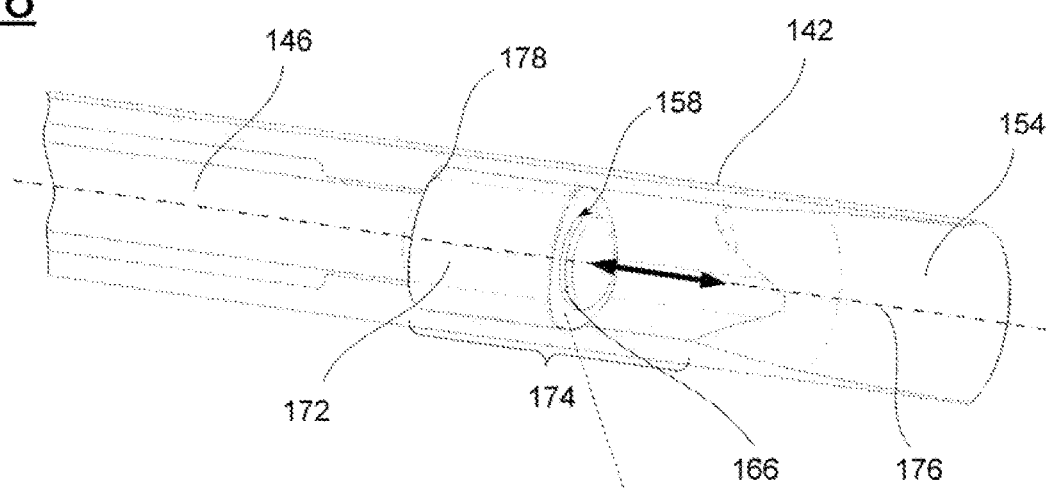

FIG. 8 shows details of the second internal thread 158. The second internal thread 158 is part of a threaded insert 172 which is arranged in a corresponding section 174 of the continuous opening 154 in the second mounting sleeve 142. The threaded insert 172 is displaceable in the portion 174 axially with respect to a longitudinal axis 176 of the second mounting sleeve 142 (see double arrow). The axial displaceability is limited on both sides along the longitudinal axis 176, for example by means of an outer stop element 178 facing the second connection end 138 and an inner stop element (not illustrated in FIG. 8) facing away from the second connection end 138.

Figure 9:
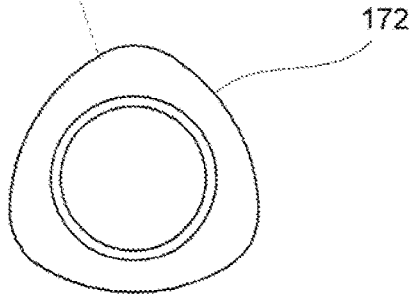

FIG. 9 shows the shaping of the threaded insert 172, wherein the outer shaping corresponds to a polygon shape P3G with rounded edges. The section 174, which may also be referred to as recess, is matched in respect to its inner shaping to the outer shaping of the threaded insert 172, wherein a form fit is formed such that the threaded insert 172 is guided so as to be displaceable in the second mounting sleeve 142 in a manner secure against rotation.

The described bolt connection 148, a multiplicity of which are provided in the divided rotor blade 110, permits the advantages and functions mentioned at the beginning.

Figure 10:
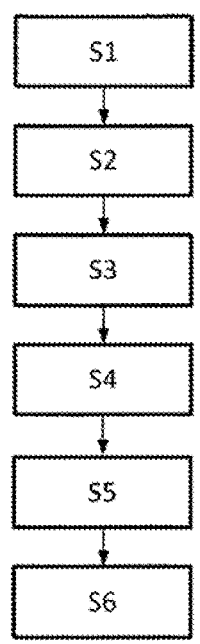
FIG. 10 shows a schematic sequence diagram of a method for producing the divided rotor blade according to an embodiment of the disclosure.

A method for connecting the two rotor blade segments 132 and 134 of the divided rotor blade 110 according to an embodiment of the disclosure is described below with reference to FIGS. 10 to 13. FIG. 10 shows a schematic sequence diagram of the method, while FIGS. 11 to 13 show various installation states.

Figure 11A:
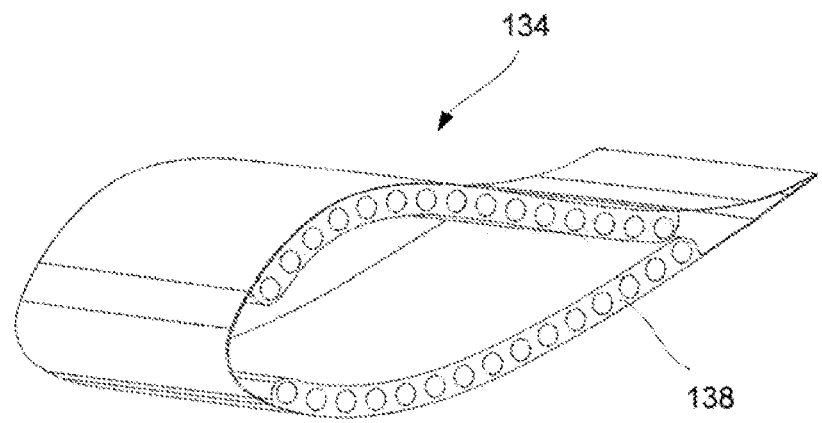
FIGS. 11A and 11B show a starting state during the installation of the divided rotor blade; and, FIGS. 12A to 12G and 13 show various installation states during the connection of two rotor blade segments with bolt connections according to FIGS. 4 to 9.
Figure 11B:
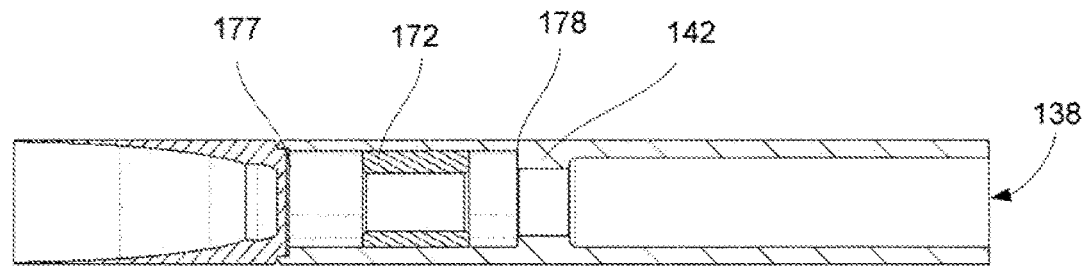

Initially, a rotor blade segment (here the second rotor blade segment 134) is in a starting situation (see FIG. 11A). In this situation, the threaded insert 172 of the second mounting sleeves 142 is located in any position between an inner stop element 177 and an outer stop element 178 (see FIG. 11B).

In a first step S1 (see FIGS. 12A and 12B), the connecting bolts 146 are partially screwed into the second internal thread 158 of the second rotor blade segment 134, wherein the threaded insert 172 is pressed against the second, inner stop 177. The connecting bolt 146 can have a marking up to which it is screwed in. Each connecting bolt 146 projects here by a predetermined length 180 out of the second connection end 138. Alternatively, in order to check a predetermined length 180, the connecting bolt 146 can be pulled out of the second connection end 138 until the threaded insert 172 lies against the outer stop element 178. The predetermined length 180 is compared with a predefined desired value in order to ensure correct installation. This is crucial so that a sufficient thread overlap of the two internal threads 156, 158 is later achieved. The assignment of the correct bolt end 160, 162 or of the correct external thread 164, 166 follows from the different threads (right-handed thread or left-handed thread) per rotor blade segment 132, 134.

In a next step S2 (see FIG. 12C), the pressure pieces 144 are pushed onto the connecting bolts 146, wherein the connecting bolts 146 are displaced inward. This can be seen by the fact that the threaded inserts 172 are moved toward the inner stop element 177.

In a next step S3 (see FIG. 12D), the first rotor blade segment 132 or the first connection end 136 is brought up to the second connection end 138 until it nearly touches the connecting bolts 146. The threaded inserts 172 are pushed here into the second mounting sleeves 142 of the second rotor blade segment 134 as far as the inner stop 177. Subsequently, the connecting bolts 146 are pulled one after another out of the second mounting sleeves 142 and are in each case threaded into a first mounting sleeve 140 aligned with the corresponding second mounting sleeve 142.

In a next step S4 (see FIGS. 12E and 12F), the first rotor blade segment 132 is moved in the direction of the second rotor blade segment 134 until the connecting bolts 146 are screwed to a predetermined extent into the first internal threads 156 of the first mounting sleeves 140.

In a next step S5 (not illustrated), the two rotor blade segments 132, 134 are pushed together to a stop, wherein the connection ends 136, 138 lie against the pressure pieces 144 and the threaded insert 172 lies again against the inner stop 177. Owing to the axial displaceability of the second internal threads 158 by means of the threaded inserts 172 ("movable bearings"), the required axial (and also radial) plays for threading in and mounting are present. In particular, the inside diameter of the sleeve is greater than the outside diameter of the threaded insert.

In a next step S6 (see FIG. 12G), the connecting bolts 146 are tightly screwed. The two connection ends 136, 138 are tightened here with respect to each other, with the threaded inserts 172 also striking against the outer stop elements 178. The screw connection takes place by means of a suitable tool which is fitted onto the respective tool engagement points 150. During the screwing tight, each tool engagement point 150 is used as a reference point 182 in order to check the progress of the installation. The reference point "migrates" within the respective pressure piece 144 depending on the installation state, and this can be monitored via the opening 152.

Figure 12A:
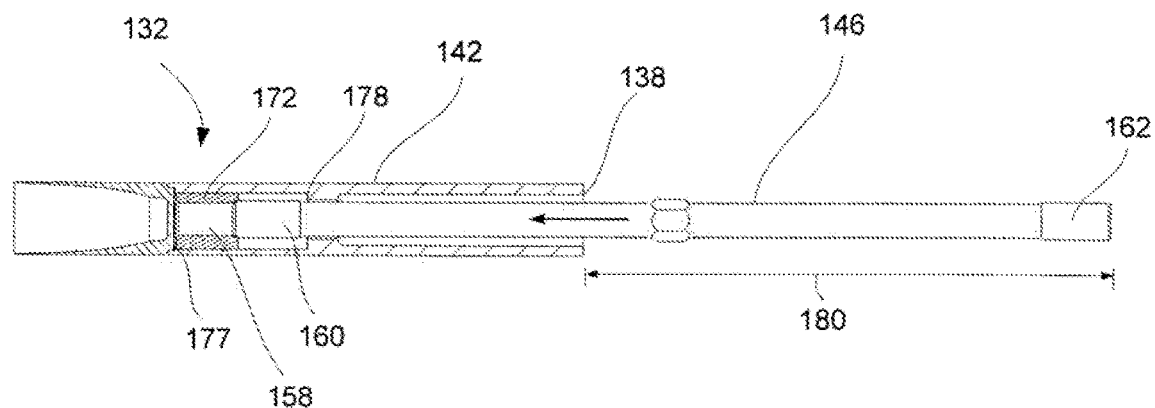
Figure 12B:
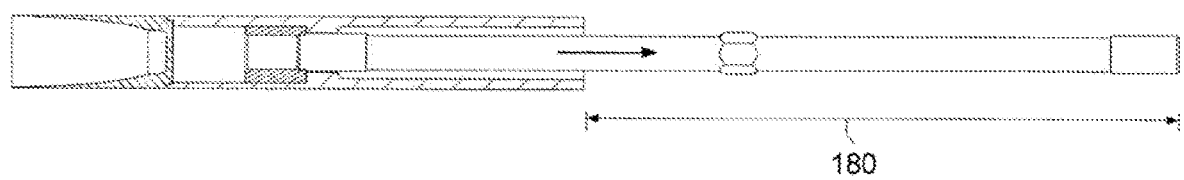
Figure 12C:
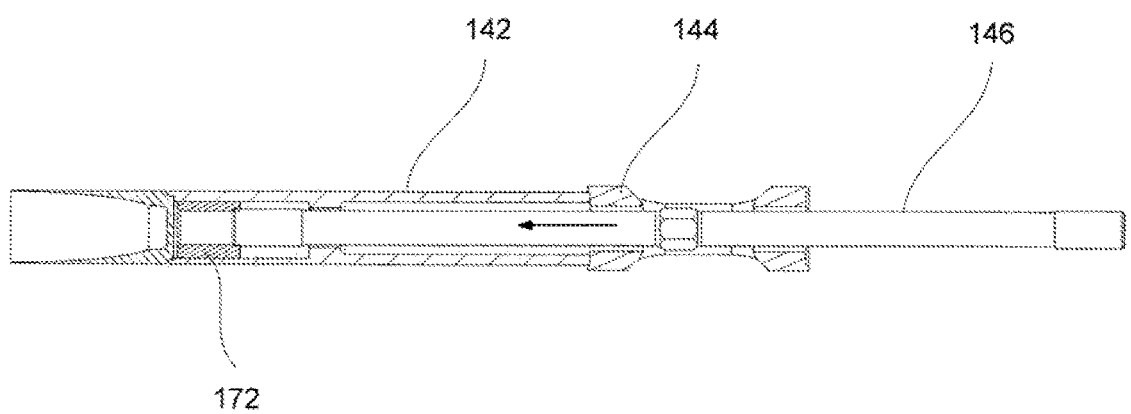
Figure 12D:
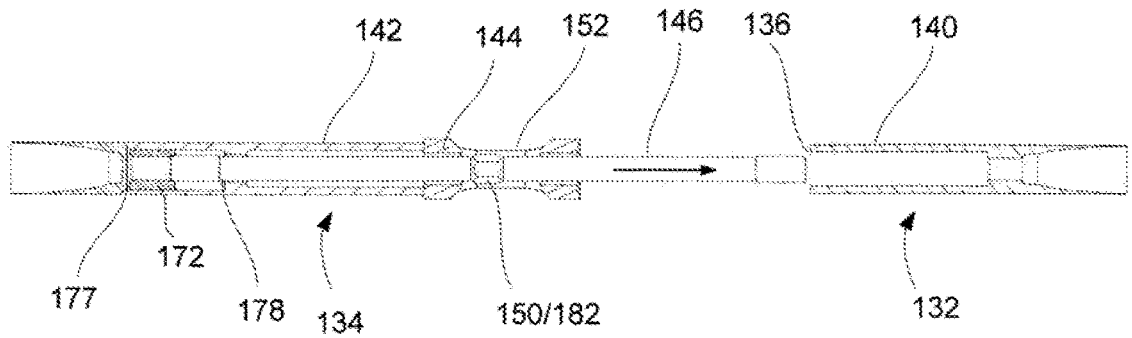
Figure 12E:
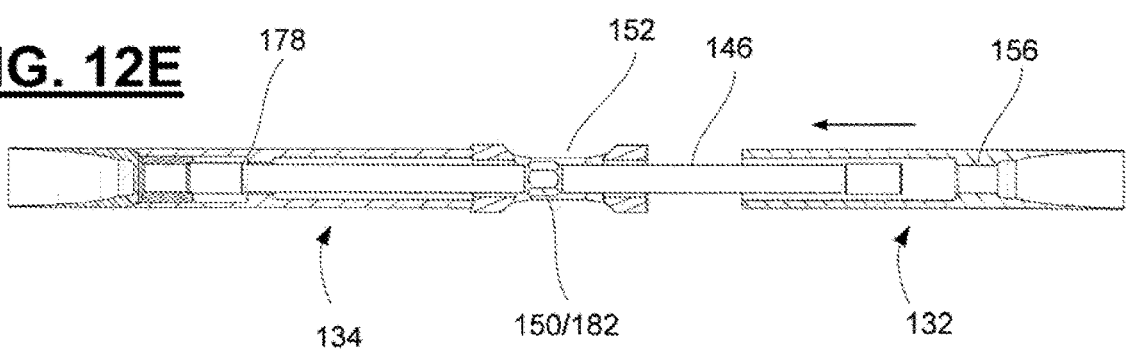
Figure 12F:
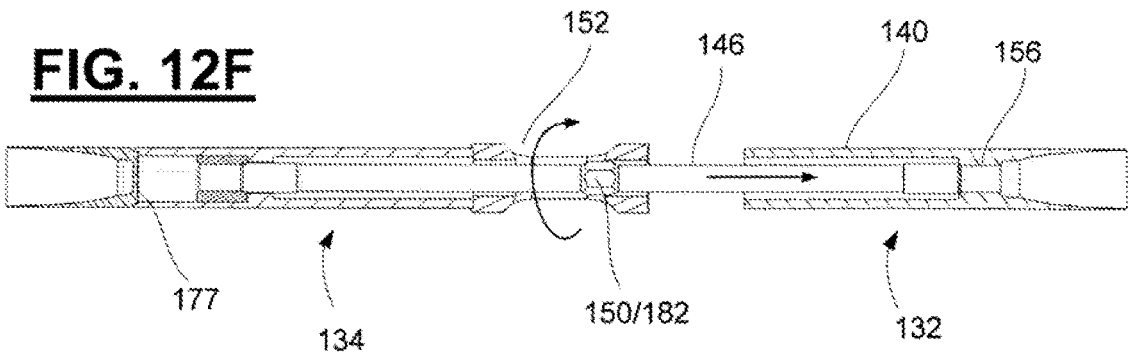
Figure 12G:
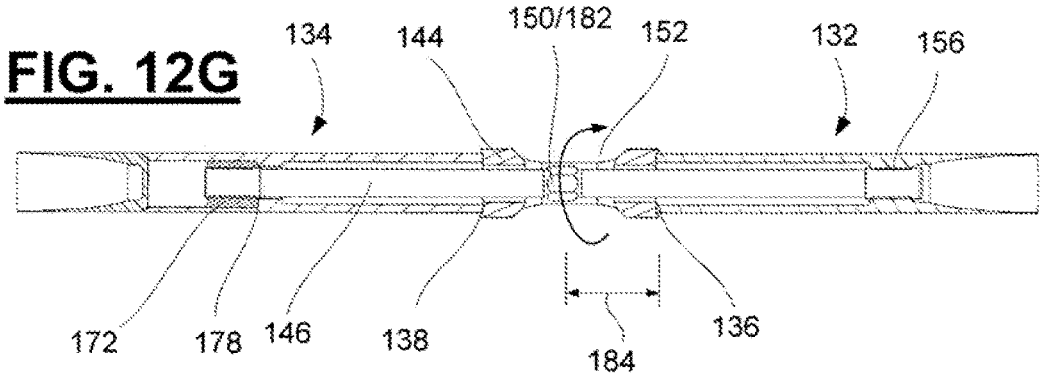
Figure 13:
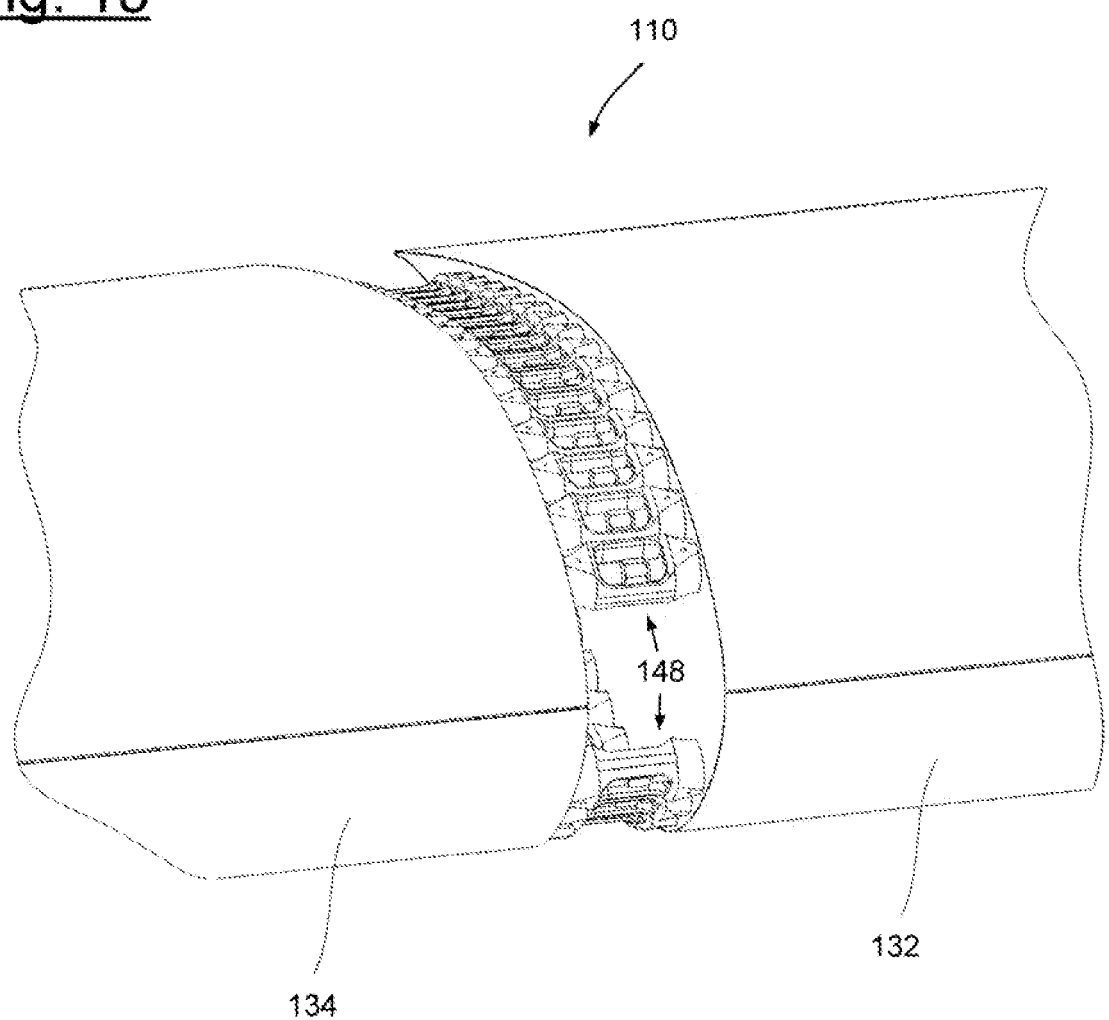

FIGS. 12G and 13 show the final installation state. A predetermined distance 184 between the first connection end 136 and each reference point 182 should prevail here.

It should be mentioned at this juncture that the above statements also apply equally to a divided rotor blade having two or more dividing points 130. In this case, the divided rotor blade would have three or more rotor blade segments.

It is understood that the foregoing description is that of the preferred embodiments of the invention and that various changes and modifications may be made thereto without departing from the spirit and scope of the invention as defined in the appended claims.

LIST OF REFERENCE SIGNS

100 wind turbine
102 tower
104 foundation
106 nacelle
108 rotor
110 rotor blade
112 rotor hub
114 rotor blade root region
116 transition region
118 profile region
120 direction of longitudinal extent
122 pressure side
124 suction side
126 rotor blade connection end
128 flange connection
130 dividing point
132 first rotor blade segment
134 second rotor blade segment
136 first connection end
138 second connection end
140 first mounting sleeve
142 second mounting sleeve
144 pressure piece
146 connecting bolt
148 bolt connection
150 tool engagement point
152 opening
154 continuous opening
156 first internal thread
158 second internal thread
160 first end
162 second end
164 first external thread
166 second external thread
168 bevel
170 wall
172 threaded insert
174 section of the second mounting sleeve
176 longitudinal axis
177 inner stop element
178 outer stop element
180 predetermined length
182 reference point
184 predetermined distance
S1 to S6 steps

What is claimed is:

1. A wind turbine rotor blade comprising:
a first rotor blade segment having a first connection end;
a second rotor blade segment having a second connection end assigned to said first connection end;
said first rotor blade segment having a plurality of first mounting sleeves at said first connection end;
said plurality of first mounting sleeves each having a first internal thread;
said second rotor blade segment having a plurality of second mounting sleeves at said second connection end;
each of said plurality of second mounting sleeves defining a longitudinal axis and having a second internal thread arranged therein, wherein each of said second internal threads is displaceable axially with respect to a corresponding one of the longitudinal axes;
a plurality of connecting bolts each configured to threadably engage a pair of mutually aligned ones of said plurality of first mounting sleeves and said plurality of second mounting sleeves via corresponding ones of said first internal thread and said second internal thread such that said first rotor blade segment and said second rotor blade segment are mechanically interconnected at said first connection end and said second connection end; and,
each of said plurality of second mounting sleeves having an axially displaceable threaded insert which includes said second internal thread.

2. The wind turbine rotor blade of claim 1, wherein each of said first internal threads is arranged in a fixed position with respect to a corresponding one of said first mounting sleeves.

3. The wind turbine rotor blade of claim 1, wherein each of said first mounting sleeves defines a corresponding first longitudinal axis; and, each of said first internal threads is displaceable axially with respect to a corresponding one of said first longitudinal axes.

4. The wind turbine rotor blade of claim 1, wherein an axial displaceability of each second internal thread is limited.

5. The wind turbine rotor blade of claim 1, wherein an outer shaping of said plurality of axially displaceable threaded inserts is matched to an inner shaping of a corresponding one of said second mounting sleeves such that each axially displaceable threaded insert is guided in the corresponding one of said second mounting sleeves in a manner secure against rotation via a form fit.

6. The wind turbine rotor blade of claim 5, wherein the outer shaping of each of said axially displaceable threaded inserts includes a polygonal shape.

7. The wind turbine rotor blade of claim 5, wherein the outer shaping of each of said axially displaceable threaded inserts includes a polygonal shape with rounded edges.

8. The wind turbine rotor blade of claim 1, wherein each of said plurality of connecting bolts has a tool engagement point.

9. The wind turbine of claim 8, wherein said tool engagement point is hexagonal.

10. The wind turbine rotor blade of claim 1 further comprising:
a plurality of pressure pieces arranged between said first connection end of said first rotor blade segment and said second connection end of said second rotor blade segment; and,
each of said plurality of pressure pieces is configured as a sleeve and applied to a corresponding one of said plurality of connecting bolts.

11. The wind turbine rotor blade of claim 10, wherein each of said connecting bolts has a tool engagement point; and, each of said plurality of pressure pieces defines at least one opening configured to provide access to said tool engagement point.

12. The wind turbine rotor blade of claim 11, wherein each of said plurality of pressure pieces has a wall delimiting said at least one opening and each of said walls delimiting said at least one opening are provided with at least one bevel.

13. The wind turbine rotor blade of claim 1, wherein said first internal threads include right-handed threads and said second internal threads include left-handed threads; or, said first internal threads include left-handed threads and said second internal threads include right-handed threads.

14. A mounting sleeve for a wind turbine rotor blade including a first rotor blade segment having a first connection end and a second rotor blade segment having a second connection end assigned to the first connection end, the first rotor blade segment having a first mounting sleeve at the first connection end, the first mounting sleeve having a first internal thread; the mounting sleeve comprising:
a mounting sleeve body defining a longitudinal axis and having an internal thread arranged therein;
said internal thread being displaceable axially with respect to the longitudinal axis; and,
wherein the wind turbine rotor blade includes a connecting bolt configured to threadably engage the first mounting sleeve and the mounting sleeve via the first internal thread and said internal thread such that the first rotor blade segment and the second rotor blade segment are mechanically interconnected at the first connection end and the second connection end; and,
an axially displaceable threaded insert which includes said internal thread.

15. A method for connecting a first rotor blade segment of a wind turbine rotor blade to a second rotor blade segment of the rotor blade, wherein
the first rotor blade segment has a first connection end and the second rotor blade segment has a second connection end assigned to the first connection end, the first rotor blade segment has at the first connection end a plurality of first mounting sleeves which each have a first internal thread, and the second rotor blade segment has, at the second connection end, a plurality of second mounting sleeves which each have a second internal thread, wherein each of the plurality of second internal threads is displaceable axially with respect to a longitudinal axis of the corresponding second mounting sleeve,
the method comprising:
partially screwing connecting bolts into the second internal threads of the second connection end such that each of the connecting bolts projects by a predetermined length from the second connection end;
bringing the first connection end of the first rotor blade segment to the second connection end of the second rotor blade segment;
partially screwing the connecting bolts into corresponding ones of the first internal threads of the first connection end;
pushing together the two rotor blade segments; and,
tightly screwing each of the connecting bolts such that a predetermined distance is achieved between a reference point defined on the connecting bolt and one of the first connection end and the second connection end.

16. The method of claim 15, further comprising, after the step of partially screwing the connecting bolts into the second internal thread, applying a pressure piece to each of the connecting bolts; and, wherein, in said tightly screwing step, the predetermined distance is achieved on a basis of a tool engagement point of the pressure pieces as the reference point.

* * * * *